(12) United States Patent
Alzate-Gaviria et al.

(10) Patent No.: US 10,734,822 B2
(45) Date of Patent: Aug. 4, 2020

(54) ELECTRONIC CIRCUIT FOR HARVESTING ENERGY FROM ULTRA-LOW POWER SOURCES

(71) Applicant: CENTRO DE INVESTIGACION CIENTIFICA DE YUCATAN, A.C., Merida (MX)

(72) Inventors: Liliana Maria Alzate-Gaviria, Merida (MX); Jorge Arturo Dominguez-Maldonado, Merida (MX); Francisco Javier Del Rio-Rivera, Merida (MX); Manuel Israel Flota-Banuelos, Merida (MX); Gerarado Raymundo Camara-Chale, Merida (MX)

(73) Assignee: CENTRO DE INVESTIGACION CIENTIFICA DE YUCATAN, A.C., Merida (MX)

( * ) Notice: Subject to any disclaimer, the term of this patent is extended or adjusted under 35 U.S.C. 154(b) by 296 days.

(21) Appl. No.: 15/752,830

(22) PCT Filed: Nov. 27, 2015

(86) PCT No.: PCT/IB2015/059184
§ 371 (c)(1),
(2) Date: Feb. 14, 2018

(87) PCT Pub. No.: WO2017/089871
PCT Pub. Date: Jun. 1, 2017

(65) Prior Publication Data
US 2019/0006857 A1    Jan. 3, 2019

(51) Int. Cl.
*H02J 3/38*    (2006.01)
*H02J 7/34*    (2006.01)
(Continued)

(52) U.S. Cl.
CPC ....... *H02J 7/0024* (2013.01); *H01M 10/4264* (2013.01); *H01M 10/44* (2013.01);
(Continued)

(58) Field of Classification Search
CPC ...... H02J 7/0013; H02J 7/0018; H02J 7/0019; H02J 7/0024; H02J 7/34; H01M 10/44; H01M 10/4264; H01M 10/46
See application file for complete search history.

(56) References Cited

U.S. PATENT DOCUMENTS 6,100,665 A * 8/2000 Alderman ........... H01M 6/5033
320/127
6,140,799 A * 10/2000 Thomasson ......... H01M 10/441
320/117
(Continued)

FOREIGN PATENT DOCUMENTS

MX    2011013241 A    6/2013
WO    2007082168 A2   7/2007
WO    2007082168 A3   7/2007

OTHER PUBLICATIONS

Alatai et al, "Microbial fuel cell energy harvesting using synchronous flyback converter", Journal of Power Sources, vol. 247, Feb. 1, 2014, pp. 636-642.
(Continued)

*Primary Examiner* — Rexford N Barnie
*Assistant Examiner* — Rasem Mourad
(74) *Attorney, Agent, or Firm* — Shumaker, Loop & Kendrick, LLP; Patrick B. Horne

(57) ABSTRACT

The present invention relates to an electronic circuit for harvesting energy from ultra-low power sources, said circuit comprising a capacitor module (1), a microcontroller (2), two analog switches (3 and 7), an auxiliary battery module (4), a terminal (5), and an operating mode module (6). The
(Continued)

circuit is characterised in that: at least two sources (FE) from a plurality of sources (FE) are connected to the capacitor module (1); and the microcontroller (2) transmits the RC digital signals [1.4] at the capacitor module (1) to the first set of analog switches and changes from an idle state to an active state. In addition, the microcontroller (2) is configured to: perform an energy storage step, by connecting the energy sources in parallel with the capacitors; perform a first amplification step, by reconnecting the set of capacitors in series with one another via the first set of analog switches connected in parallel, by means of a switch, with the array of auxiliary batteries that are connected in parallel with one another; perform a first step of transferring energy from the capacitors to the auxiliary batteries; perform a second energy amplification step, by reconnecting the array of batteries connected in series with one another via the second set of analog switches; perform a second step of transferring the energy amplified by the auxiliary batteries by means of a switch, by means of which the auxiliary batteries connected in series with one another are connected in parallel with a main external battery, transferring the energy to same.

19 Claims, 8 Drawing Sheets

(51) Int. Cl.
| | | |
|---|---|---|
| | *H02J 3/06* | (2006.01) |
| | *H02J 7/00* | (2006.01) |
| | *H01M 10/46* | (2006.01) |
| | *H01M 10/44* | (2006.01) |
| | *H01M 10/42* | (2006.01) |
| | *H02J 50/20* | (2016.01) |
| | *H02J 50/00* | (2016.01) |

(52) U.S. Cl.
CPC .......... *H01M 10/46* (2013.01); *H02J 7/0013* (2013.01); *H02J 7/0019* (2013.01); *H02J 7/34* (2013.01); *H02J 50/00* (2016.02); *H02J 50/20* (2016.02)

(56) References Cited

U.S. PATENT DOCUMENTS

| | | | | |
|---|---|---|---|---|
| 6,936,994 | B1 | 8/2005 | Gimlan | |
| 2003/0231003 | A1* | 12/2003 | Ballard | H02J 7/0072 320/116 |
| 2009/0067208 | A1 | 3/2009 | Martin et al. | |
| 2009/0251099 | A1* | 10/2009 | Brantner | H02J 7/0032 320/101 |
| 2010/0060231 | A1* | 3/2010 | Trainor | H01G 11/14 320/103 |
| 2011/0254514 | A1* | 10/2011 | Fleming | H02M 3/07 320/166 |
| 2011/0260686 | A1 | 10/2011 | Ford | |
| 2013/0076145 | A1 | 3/2013 | Kim et al. | |
| 2017/0117595 | A1* | 4/2017 | Hase | H01M 2/34 |

OTHER PUBLICATIONS

Adnan Harb, "Energy harvesting: State-of-the-art", Renewal Energy. vol. 36, No. 10, Oct. 2011, pp. 2641-2654.

Kim et al., "Capturing power at higher voltages from arrays of microbial fuel cells without voltage reversal", Energy Environ. Sci., vol. 4, Issue 11, Nov. 2011, pp. 4662-4667.

Hatzell et al., "Powering microbal electrolysis cells by capacitor circuits charged using microbial fuel cell", Journal of Power Sources. vol. 229, May 2013, pp. 198-202.

International Search Report (IRS) and English translation for PCT/IB2015/059184 dated Jul. 19, 2016 (9 pages).

* cited by examiner

ELECTRONIC CIRCUIT FOR HARVESTING ENERGY FROM ULTRA-LOW POWER SOURCES

TECHNICAL FIELD

The present invention relates to the technical field of electronics applied to renewable energies, in particular, technology relating to energy harvesting from sources of ultra-low power and refers specifically to an electronic circuit of capacitors combined with intermediate auxiliary batteries, which are incorporated in an electronic circuit. This electronic circuit is used to store, amplify and transfer the power generated by ultra-low energy sources to an outside main battery.

BACKGROUND

Micro or nanoscale energy harvesting raises the possibility of creating a technology capable of reducing maintenance costs and inconveniences involving conventional wiring systems. Some ultra-low power energy sources include biological, mechanical vibration, radio frequency electromagnetic, pressure gradients, temperature gradients, solar among others related to renewable energies (Harb, 2011).

The first electronic devices designed to harvest energy were based on passive components that only had the function of recirculating electrons, as the resistors that dissipate power as heat. However, to harness the energy is required to store it in capacitors and then amplify using series and parallel configurations, in this way, the voltage obtained can be useful for some electronic device (Park, 2014).

An alternative that has been proposed to store energy is to use capacitors connected in parallel and then reconfigure the array of capacitors in series to amplify the collected voltage (Logan, 2011) (Logan, 2013).

The present invention addresses the problem of developing and implementing new designs to centralize power in a hybrid energy system once it has been stored.

Some solutions addressed in the state of the art, are described below. For example, Patent Application US 2011/0254514 A1, describes a method and apparatus for converting low voltage and energy storage using a charge pump including a first set of capacitors connected in parallel with a second set of capacitors and switches for selectively coupling the first and second set of capacitors to a variable input DC voltage, with a data processor programmed to control one or more switches for coupling the first and second set of capacitors to a variable input DC voltage for a first variable time period in which first and second set of capacitors are charged to a DC voltage level. An energy storage device is coupled switchable to a matrix output charge pump. The data processor controls by a programmable way one or more switches for coupling the matrix output charge pump to the storage device power for a second variable time period, during which a voltage stored across each capacitor during the first time period, is combined to produce a significantly greater than the DC input voltage, the higher voltage being provided to power storage device.

Another solution has been proposed in the patent application US 2013/0076145 US A1, which describes an electronic circuit to increase voltages of one or more energy sources. The electronic circuit may include a first set of capacitors and a second set of capacitors, and a first set of switches associated with the first set of capacitors and a second set of switches associated with a second set of capacitors. It also includes at least one energy source and an external load. The first and second set of capacitors, first and second set of switches, the power source and the external load are arranged and connected such that the first set of capacitors is connected to at least one power source in parallel while the second set of capacitors is connected to the external load in series and vice versa.

These developments are emerging and are focused on specific energy sources such as thermoelectric and microbial energy respectively, which limits its operating range and current output due to the problem of connecting different ultra-low power sources in parallel configuration, since the behavior of different sources vary in voltage amplitude, oscillation frequency and energy density (Harb, 2011). However, there exist in the state of the art electronic systems that connect each of the various energy sources to a capacitor in parallel and store the energy, once the control system detects the desired voltage for energy transfer then active switches, in order to disconnect the capacitors of them independent energy sources and connecting capacitors in series to each other resulting in the sum of the voltages, i.e.; the present invention describes the design and implementation of an electronic circuit that harvest and/or collects energy from multiple sources of ultra-low power, e.g. mechanical vibration, electrochemical, thermal, etc. Wherein the electronic circuit uses capacitors as initial storage medium and then combined with auxiliary batteries that allow power transfer to a central battery 12 V. This solution allows to integrate energy sources available in different environments, such as: transport, commercial or domestic. Furthermore, the present invention describes the versatility of using energy in systems involving inverters with a nominal input of 12 V in direct current and converts it to alternating current, which can supply energy to a wide range of electrical and electronic devices, such as will be described later in a detailed form.

SUMMARY OF THE INVENTION

An object of the present invention is to provide an electronic circuit to harness the energy of ultra-low power generated by various technologies.

Another object of the present invention is to harvest energy available from ultra-low power sources and convert it to 12 V.

Another object of the present invention is to convert the energy to useful power supply for electrical devices and/or applied electronics, for example, in the industry, transport, commercial and domestic sectors.

Another object of the invention is to provide an electronic circuit for energy management which amplifies the voltage from ultra-low power sources, for using in various electronic devices such as sensors, LEDs, transmitters, etc.

Furthermore, another object of the present invention is to provide an electronic circuit that amplifies the input voltage using capacitors that collect and temporarily store energy, which is transferred to auxiliary batteries and finally to the main battery.

Furthermore, another object of the present invention is to provide an alternative for data acquisition by means of setting a microcontroller implemented to an interface in situ of the energy harvesting electronic circuit. Furthermore, another object of the present invention is to provide an electronic circuit capable of coupling to an inverter, allowing high versatility.

The above objects are achieved by means of an electronic circuit to harvest energy from ultra-low power sources integrated by a module of capacitors (1), a microcontroller (2), two analog switches (3 and 7), a module of auxiliary batteries (4), a block terminal (5) and a module for operating mode (6), with the follow characteristics: at least two energy sources (FE) of the plurality of energy sources (FE) are connected to the module of capacitors (1); and the microcontroller (2) sends the digital signals RC [1.4] to the module of capacitors (1) to the first set of analog switches and passes from an inactive state to an active state; besides, the microcontroller (2) is configured to: perform a stage of energy storing, by connecting power sources in parallel with the capacitors; performing a first amplification step, by reconnecting the set of capacitors in series with each other through the first set of analog switches connected in parallel by means of a switch with auxiliary batteries array which are connected in parallel with each other; performing a first step of energy transference from the capacitors to the auxiliary batteries; performing a second energy transference step, by reconnecting the auxiliary batteries array that are connected in series with each other through the second set of analog switches, performing a second energy transference step of the amplified energy coming from the auxiliary batteries by a switch, that connects in parallel the auxiliary batteries (connected in series with each other) with a main external battery, transferring that energy.

BRIEF DESCRIPTION OF THE DRAWINGS

The present invention will be fully understood from the detailed description given herein below and the attached drawings, which are only given as illustration and example and thus are not limited with respect to aspects of the present invention. In the drawings, identical reference numbers identify similar elements or actions. The sizes and relative positions of elements in the drawings are not drawn necessarily to scale. For example, the shapes of various elements and angles are not drawn to scale, and some of these elements are arbitrarily enlarged and positioned to improve the drawing appreciation. Additionally, the particular elements shapes as they have been drawn, are not intended to convey any information regarding the real shape of the particular elements, and have been selected only for easy recognition in the drawings, wherein.

DETAILED DESCRIPTION OF THE PREFERRED EMBODIMENTS

Various aspects of the present invention are described in more detail below with reference to the drawings (figures, diagrams, tables, flowcharts and graphs) attached, in which variations and aspects of the present invention are shown. Several examples of the present invention aspects may, however, be made in many different forms and should not be interpreted as limitations on the variations set up in the present invention, quite the opposite, variations are provided so that this description will be complete in illustrative implementations, and the scope itself will fully convey to experts in the state of the art.

Unless otherwise defined, all technical and scientific terms used in this document have the same meaning commonly understood by one skilled in the state of the art to which aspects of the present invention belong. Methods, processes, systems, circuits and examples provided herein are only illustrative and are not intended to be limiting.

Unlike reported in the state of the art, this invention contemplates two amplification steps to increase the voltage of various energy sources to a voltage range from 12 up to 14.4 V. The first step employs capacitors connected in series and the second step includes batteries connected in series.

The present invention describes an energy harvesting electronic circuit that allows to obtain energy from different sources of ultra-low power in the range of 1 to 10 μW and voltage less than 1 V, therefore, different power sources with these features, such as solar, piezoelectric, biological, among others; can be connected in parallel with the capacitors and thus store energy for a period of 24 h.

Figure 1:
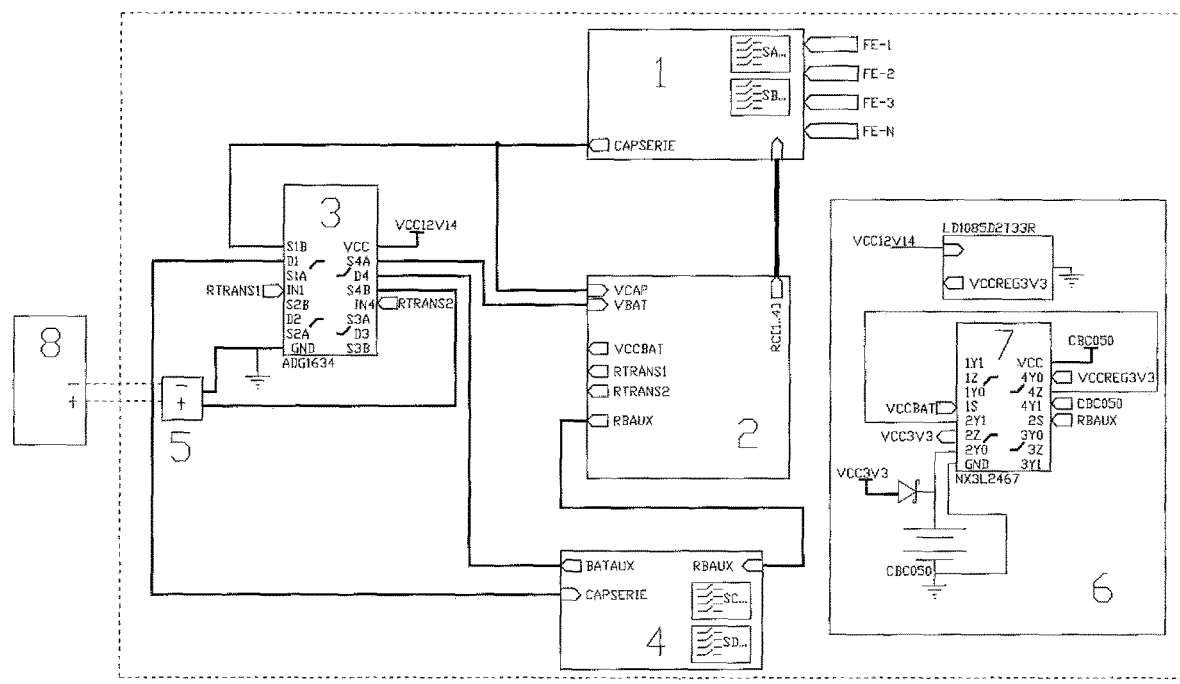
FIG. 1 illustrates a general diagram of the energy harvesting electronic circuit, which comprises eight principal components in accordance with the present invention.
Figure 2:
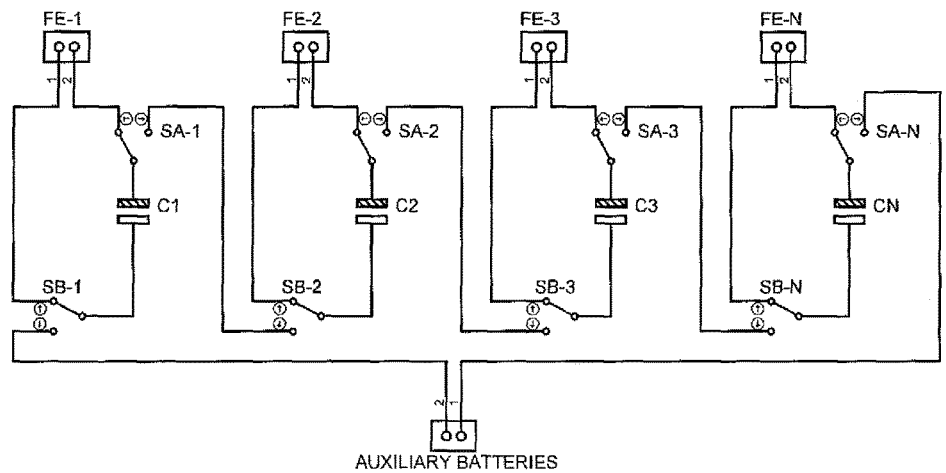
FIG. 2 shows an electronic circuit illustrating the arrangement of capacitors (C1, C2, etc.) connected to the ultra-low power sources, in the loading step (FE -1, FE -2, etc.), accordance with one embodiment of the present invention.
Figure 3:
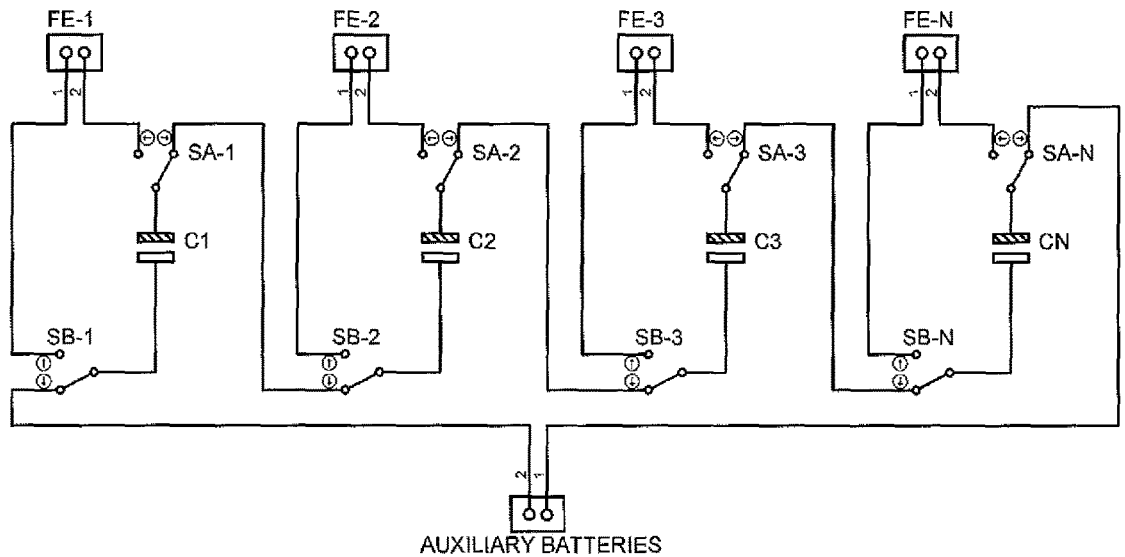
FIG. 3 shows an electronic circuit illustrating the arrangement of capacitors (C1, C2, etc.) connected in series with each other with the auxiliary batteries block terminal (SA-1, SA -2, etc.) in accordance with one embodiment of the present invention.

FIG. 1 outlines the amplification, storage, processing and transfer voltage stages, where the plurality of energy sources FE is connected to the capacitors module (1), the microcontroller (2) sends the digital signals RC [1.4] to change the state of analog switches (3) to active (in FIGS. 2 and 3 are described in greater detail the operation of this module). Capacitor module (1) performs the first amplification step, where the output voltage is CAPSERIE which is read by the microcontroller as an analog signal (2) via VCAP. If the voltage is higher than the nominal voltage of auxiliary batteries connected in parallel with each other (e.g. 1.2, 2.4, 3.6 V, etc.), the microcontroller (2) sends the digital signal RTRANS1 to pin activation IN1 in the analog switch ADG1634 (3), so the pin D1 and S1B have continuity and the voltage is transferred to the auxiliary battery module (4) via CAPSERIE. The analog switch ADG1634 (3) has four MOSFET-CMOS single pole double throw switches and is powered by the voltage VCC12V14 from the auxiliary batteries connected in series with each other or for the main external battery (8) which can be from 0.3 to 16 V and a maximum current transference of 119 mA. The RBAUX digital signal sent by the microcontroller (2) to the auxiliary batteries module (4), connect the auxiliary batteries in parallel (this process is described in more detail in FIGS. 4 and 5).

The auxiliary batteries voltage in parallel (4) BATAUX, passing through the normally closed terminal S4A of analog switch (3), is monitored every 24 hours via VBAT analog input in the microcontroller (2) and then compared with voltage capacitors in series VCAP, while VCAP is higher than VBAT capacitors in series will transfer power to the auxiliary batteries (4). Once VCAP and VBAT are equal, the microcontroller (2) put RBAUX low to return the auxiliary batteries to their series connection and subsequently the microcontroller (2) put high RTRANS2 and pin IN4 for the second amplification step and transfer the current through D4 and S4B to the auxiliary batteries connected in series with the block terminal (5) which capacity is for 10 A, wherein is connected the main external battery (8). The operation mode module (6) allows the electronic circuit functions in energy self-supply mode. This module has an analog switch NX3L2467 (7) which has two MOSFET -CMOS switches double pole double throw whose operating values are from 1.4 up to 4.3 V and current between switch terminals of 350 mA. The switch (7) is powered with the solid state battery voltage CBC050 3.3 V to 50 µA and through the normally closed terminal 2Y0 and common 2Z of analog switch (7) supplies the VCC3V3 voltage that power all electronic circuit. Once the microcontroller (2) detect the first transference cycle sends a VCCBAT digital signal which disconnects 2Y0 and connect 2Z with 2Y1, supplying the electronic circuit with the voltage VCCREG3V3 to 3.3 V and a maximum current of 3 A supplied by the voltage regulator, prior to the regulation this voltage comes from the auxiliary batteries connected in series VCC12V14, therefore, to prevent the circuit running out of power when the auxiliary batteries are connected in parallel to the first transference step the RBAUX signal sent by the microcontroller (2) serves as a locking to connect the solid state battery CBC050 to VCC3V3 through 4Z and 4Y1 terminal, once the transference cycle is completed and RBAUX signal is low the circuit returns to be supplied by the voltage regulator VCCREG3V3. The CBC050 solid state battery is connected to VCC3V3 through a Schottky diode NSVR0320MW2T1G with a forward voltage of 0.3 V and a current of 1 A. The power consumption of energy harvesting electronic circuit in the active state is 211.2 µW (two hours), energy consumption in idle state is 62.7 µW (24 hours).

FIG. 2 outlines the array of energy sources connected to capacitors to collect the energy of each energy source FE-1, FE-2, FE-3 and so on until an FE-N source during the charge period of these. As will be well known for skilled in the state of the art, it may be provided an arrangement of FE sources plurality, according to design considerations. A power source FE includes proton exchange fuel cells with open circuit voltage less than 1 V, piezoelectric devices AC voltage less than 1 V and Peltier devices with open circuit voltage less than 1 V. In addition, FE energy sources can be AC or DC in the range of 1 mV to 1 V in voltage, with no limitations. Energy sources FE can also be radio frequency harvesters as the Powerharvester®.

FIG. 3 shows the first amplification step where the series of switches SA and SB disconnect the capacitors C (C1, C2, C3, . . . , CN) of energy sources FE once have been loaded and interconnect to each other the capacitors summing their voltages. Wherein SA is an analog switch Series A (analog switches MOSFET- CMOS, NX3RL) and SB is an analog switch Series B (MOSFET- CMOS analog switches, NX3RL). At this step, the voltage is amplified due to the sum of individual voltages of each capacitor.

Figure 4:
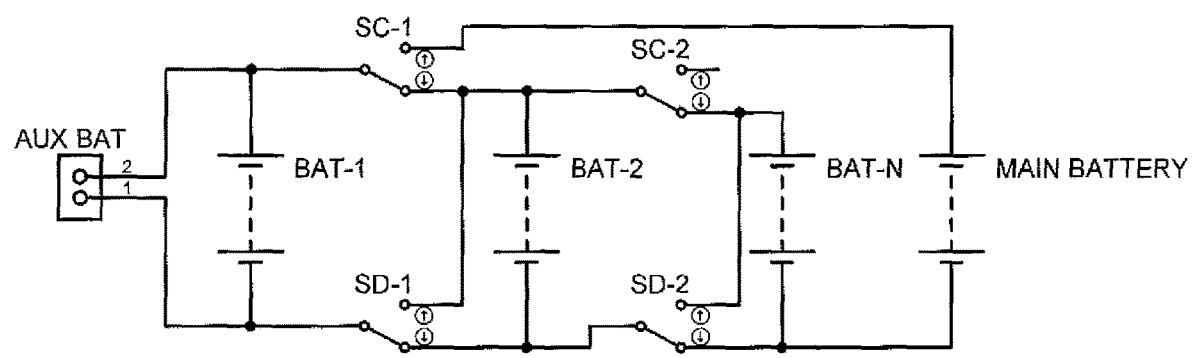
FIG. 4 shows an electronic circuit illustrating the auxiliary batteries (BAT -1, BAT- 2, etc.) connected in parallel with each other to the auxiliary batteries block terminal (BAT-AUX), in accordance with an embodiment of the present invention.

In FIG. 4 the transference step is observed, in this step, the capacitors connected in series with each other are connected to the BAT-AUX terminal transferring the voltage to batteries connected in parallel to each other (the batteries are connected in parallel by means of switches SC and SD in the high state). Because the auxiliary batteries voltage has a fixed value of 1.2 V, 2.4 V, 3.6 V, 6 V, etc., the power sources voltages sum must be considered higher than the auxiliary batteries voltage chosen for the energy harvesting electronic circuit design. Thus the transference depends on the internal resistance of the load and the power source.

Figure 5:
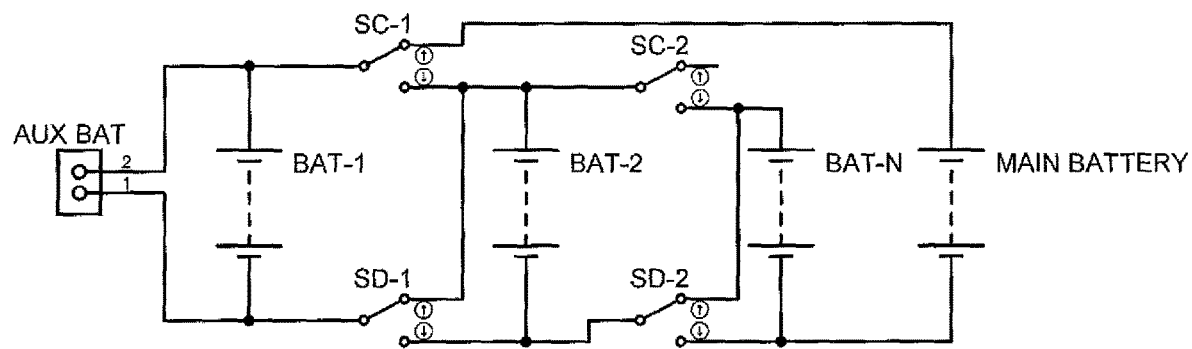
FIG. 5 shows an electronic circuit illustrating the auxiliary batteries (BAT -1, BAT- 2, etc.) connected in series with each other with the main external battery, in accordance with an embodiment of the present invention.

FIG. 5 shows the second amplification step and transference wherein the auxiliary batteries of 2.4 V (any type of battery whose voltage is between 1.2 and 7.2 V) are isolated from the capacitor through the series of analog switches SC and SD and reconfigured in series to transfer power to the external main battery of 12 V. The microcontroller monitors the transference is completed, this occurs when the auxiliary batteries voltage levels in series and 12 V external battery are the same, see FIG. 13. In FIG. 5, SC is an analog switch of Series C (MOSFET-CMOS analog switches, ADG1634) and SD is an analog switch of Series D (analog switches MOSFET- CMOS, ADG1634).

Figure 6:
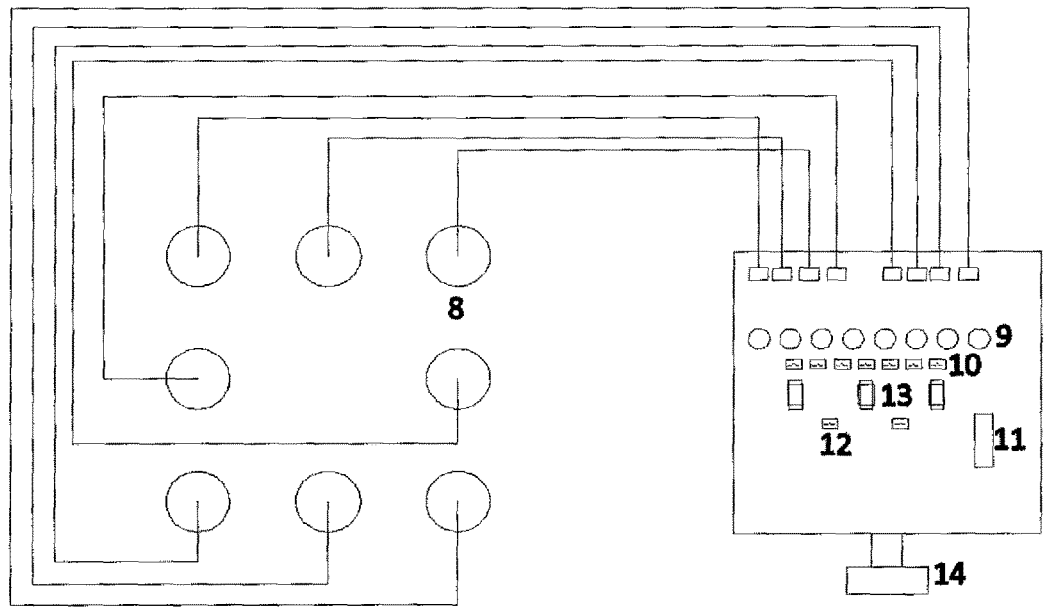
FIG. 6 outlines an electronic circuit harvest energy to charge a battery of 12 V through 8 PEM fuel cell, in accordance with an embodiment of the present invention.
Figure 7:
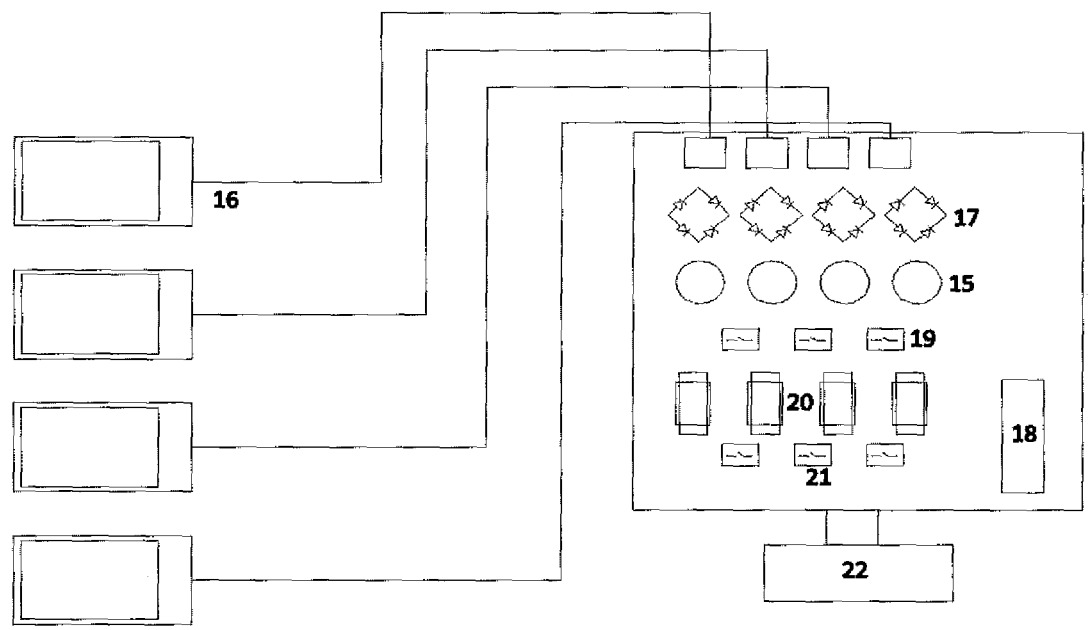
FIG. 7 outlines an energy harvesting electronic circuit to charge a battery of 12 V by means of mechanical vibrations coming from four PZT piezoelectric devices, in accordance with an embodiment of the present invention.
Figure 8:
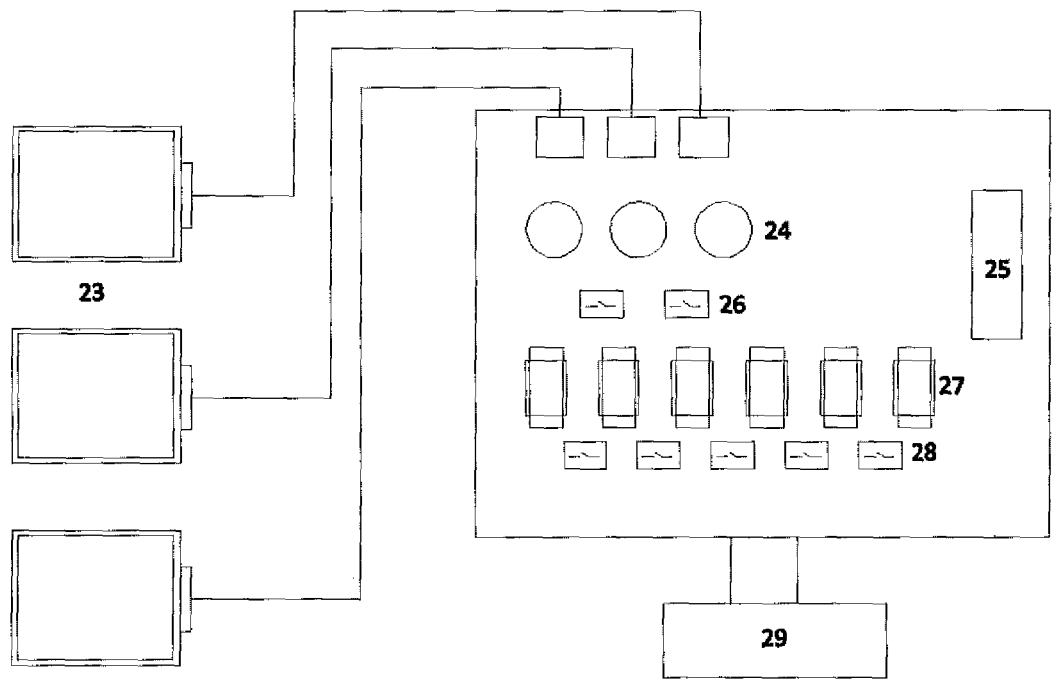
FIG. 8 outlines an energy harvesting electronic circuit to charge a 12 V battery by means of thermos-generators that transform a differential heat into electrical energy, in accordance with an embodiment of the present invention devices.
Figure 9:
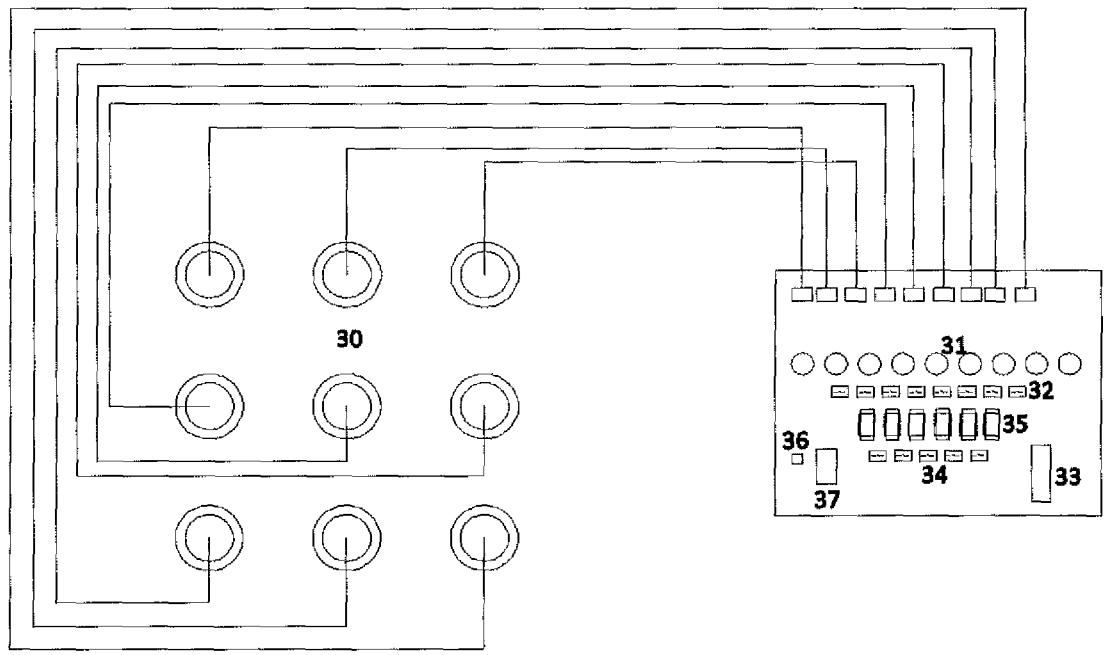
FIG. 9 outlines an energy harvesting electronic circuit coupled to microbial fuel cells operating with the energy harvested in self-power mode performance in order to extract electrons from the cells and then remove organic matter of domestic wastewater and/or in accordance with an embodiment of the present invention.

The power source FE includes various ultra-low power sources, such as PEM fuel cells of 0.5 V to 1 V open circuit voltage as shown in FIG. 6, piezoelectric devices 0.1 V to 1 V voltage current circuit AC as shown in FIGS. 7 and 0.1 V Peltier devices 1 V open circuit voltage as illustrated in FIG. 8. in these cases, energy harvesting is followed by an amplification and storage step. However, the electronic circuit of the present invention can be used solely for harvest and amplification without a final transfer of energy to an external battery as shown in FIG. 9.

FIGS. 6, 7, 8, 9 will be described in more detail below, specifically, in FIGS. 6, 7, 8, 9 will be described some implementations in accordance with some embodiments of the present invention in the corresponding examples section.

Figure 10:
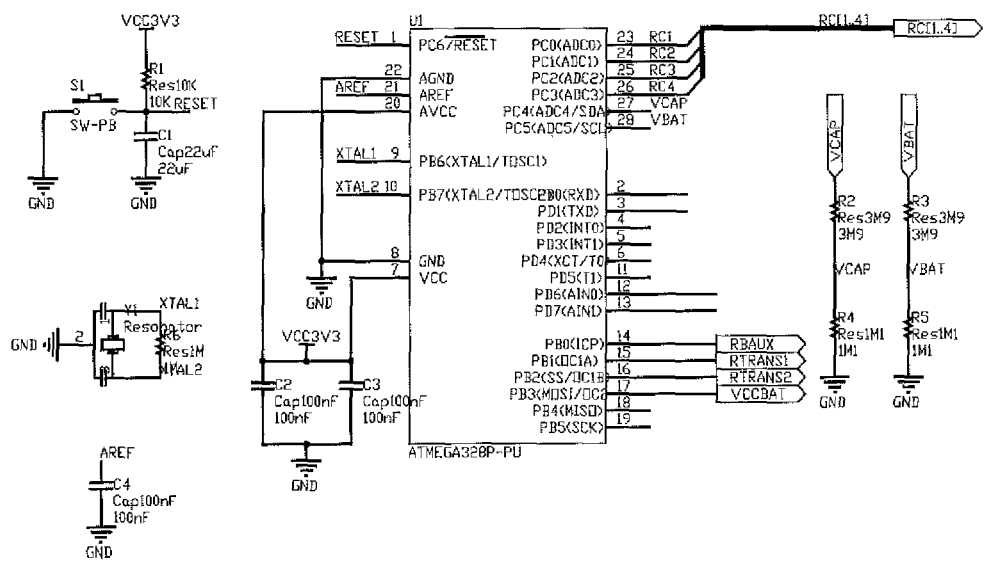
FIG. 10 illustrates the structure and configuration of a microcontroller Atmega 328P- PU, in accordance with an embodiment of the present invention.

In FIG. 10 a microcontroller ATMEGA328P -PU, comprising: digital inputs, RESET—by mechanical "push" switch normally open with four terminals and maximum operating features 12 V, 50 mA, SW-PB which resets the microcontroller, digital outputs: RC1-RC4—which connect the capacitors in series with each other, RBAUX—which connects the batteries in parallel with each other, RTRANS1—which connects the capacitors in series with the auxiliary batteries in parallel and RTRANS2—which connects the auxiliary batteries in series with the external main battery. In addition, energy consumption microcontroller ATMEGA328P-PU is: energy saving mode: 0.1 µW in active mode: 198 µW (3.3 V, 0.06 mA, 128 kHz, internal oscillator), analog inputs: VCAP: which measures voltage capacitors in series and VBAT: which measures the batteries voltage in parallel.

Figure 11:
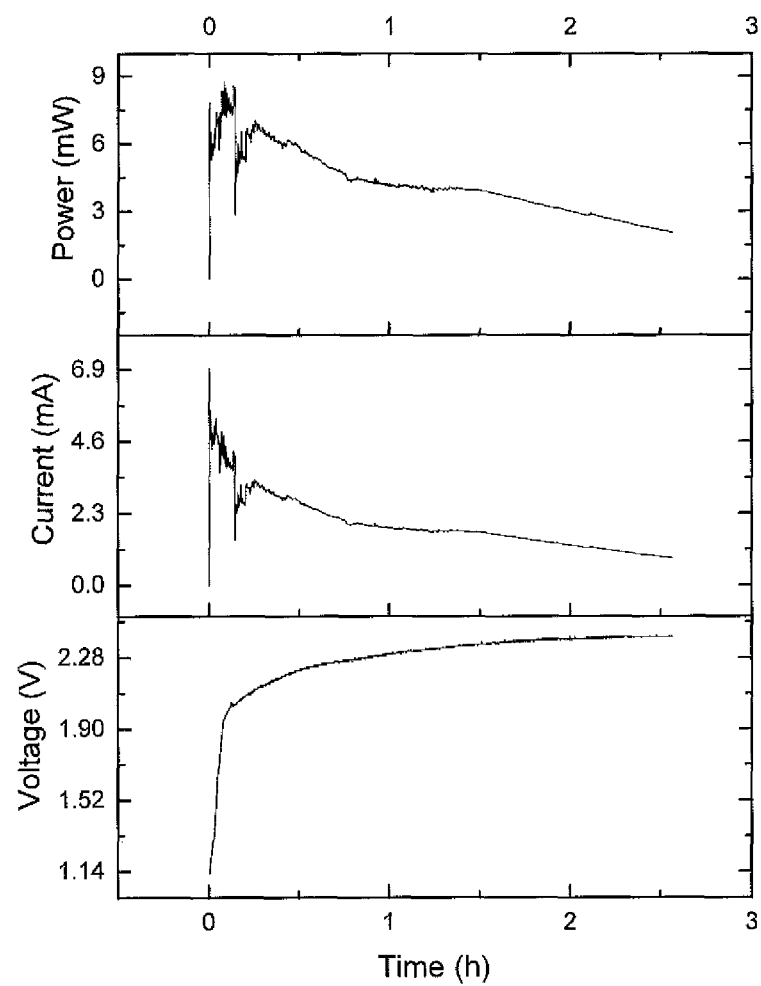
FIG. 11 illustrates the values of voltage, current and power obtained during the energy transferring from capacitors connected in series with each other and connected in parallel to the auxiliary batteries connected in parallel with each other.

FIG. 11 graphically illustrates the values of transference voltage, current and power that capacitors transfer connected in series with each other to the auxiliary batteries connected in parallel with each other, the voltage drops to 1.13 V and begins to rise exponentially until the voltage auxiliary batteries is 2.4 V. the behavior of the current begins with a peak value of 7.25 mA and starts decreasing exponentially until reaching 0.4 mA and finally power, calculated as a product of current and voltage, which peak value is 8.75 mW at 12.59 minutes after the energy transference began. The transferred energy is calculated by integrating the area under the plotted power curve with a time of 2.56 hours obtaining a value of 38.76 J.

Figure 12:
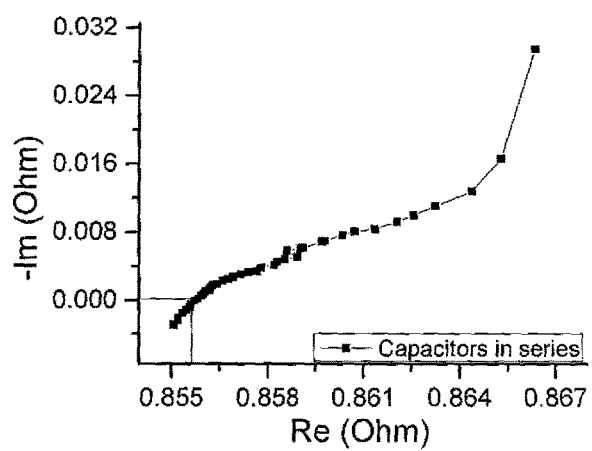
FIG. 12A shows a Nyquist diagram to determine the value of Equivalent Internal Resistance (ESR) of capacitors connected in series obtained by Potentiostatic Electrochemical Impedance Spectroscopy (PEIS), in accordance with an embodiment of the present invention.
FIG. 12B shows the Nyquist diagram to determine the Equivalent Internal Resistance (ESR) auxiliary batteries value connected in parallel to each other obtained by Potentiostatic Electrochemical Impedance Spectroscopy (PEIS), in accordance with an embodiment of the present invention.
Figure 12:
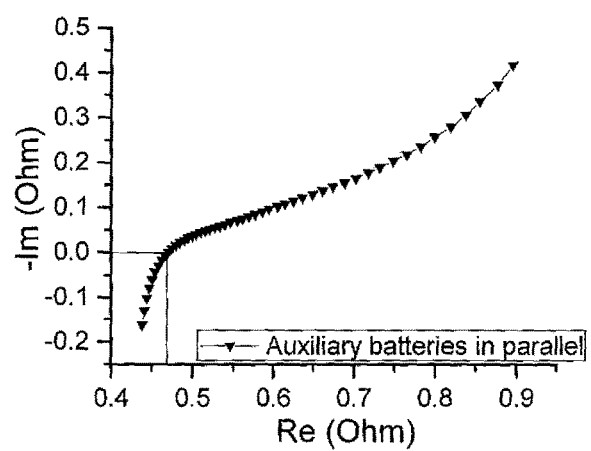

In FIGS. 12A and 12B can be observed a plot showing the impedance profile of capacitors in series (FIG. 12A) and the batteries in parallel (FIG. 12B), where the impedance plot called Nyquist diagram presents the imaginary component of impedance in the Y-axis (-Im) and the real component of impedance in the X axis (Re), each point on the graph is the impedance response to a perturbation signal voltage in alternating current (5 mV), mounted on the set voltage to be analyzed, in this case the voltage capacitors in series 4.451 V and the voltage of the batteries in parallel 1.13 V , the 5 mV perturbation signal is applied via two electrodes varying the signal frequency from 50 kHz to 10 mHz.

Each frequency applied represents a point on the Nyquist diagram, at high frequencies when the impedance profile crosses the zero in the imaginary axis, the equivalent internal resistance ESR value of the capacitors connected in series (FIG. 12A) to each other is measured crosses the real axis impedance at 0.856 ohm and the resistance of auxiliary batteries connected in parallel (FIG. 12B) does in 0.470 ohm.

Figure 13:
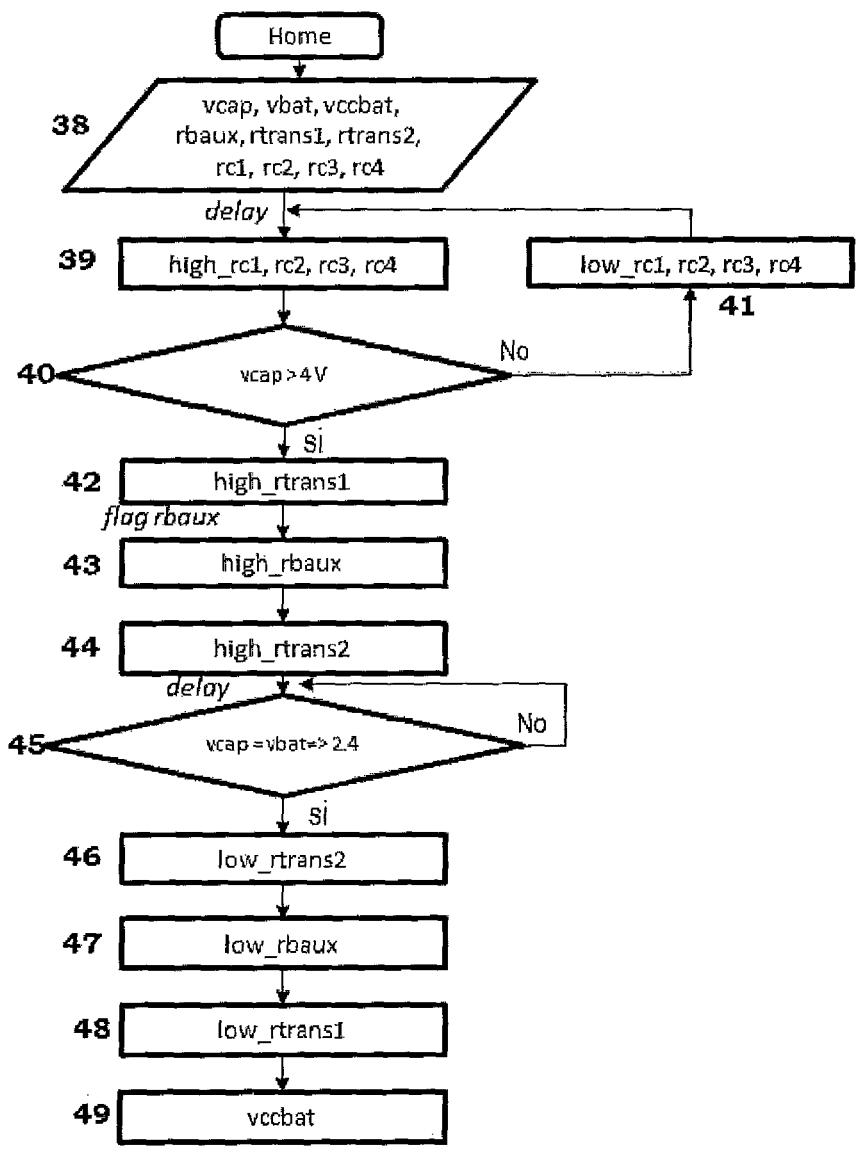
FIG. 13 illustrate a flowchart for the microcontroller Atmega 328P-PU operation algorithm integrated to the energy harvesting electronic circuit, in accordance with an embodiment of the present invention.

FIG. 13 shows the microcontroller algorithm, Atmega 328P-PU microcontroller is integrated to the energy harvesting electronic circuit. The microcontroller was programmed with AVR/C code. The vcap and vbat, analog inputs (38), measure the capacitors voltage when are connected in series, and auxiliary batteries connected in parallel respectively. The digital output vccbat enable the regulated voltage 3.3 V and supply energy to the electronic circuit after it has carried out the first transference. The rbaux digital output activates an analog switch connecting the auxiliary batteries in parallel each other. The digital outputs rtrans1 and rtrans2 activate analog switches for transferring, the first one connects the capacitors to the auxiliary batteries for the first transference step and the second connects the auxiliary battery to the external main battery which performs the second transference step. The digital outputs rc1, rc2, rc3 and rc4 (39), activate analog switches that connect the capacitors in series with each other and disconnect these from the power sources. Once the capacitors are serially connected to each other a first voltage comparator (40) is used to determine if the voltage level is the desired. The voltage comparator is set based on the characteristics of each electronic circuit depending on the number and type of capacitors or batteries which the circuit has been designed. If this condition is not accomplished, then code returns to charging capacitors state disabling the digital outputs rc (41). When the first comparator (40) is positive, i.e. that voltage in series connected capacitors is higher than desired voltage, rtrans1 (42) activate an analog switch that disconnects the auxiliary batteries from the external main battery. The rbaux digital output (43) changes the batteries connection settings from serial to parallel with each other, this output has a status flag to detect if it was the first time that the output is activated (this condition determines if it is the first transference in the electronic circuit when the self-powered mode is configured). The rtrans2 output (44) activates an analog switch to connect the serially connected capacitors in parallel with the batteries (the last connected in parallel with each other), starting the first transference step. After a delay of two hours, time needed to transfer energy according to the results of FIG. 11, the second voltage comparison between vcap and vbat (45) is performed according to the auxiliary batteries nominal voltage, as an example 2.4 V, this voltage is programmed according to the auxiliary batteries nominal voltage used in the design. If this second comparison (45) is not accomplished the code continues in the transference process (delay). Once the second comparison is achieved (45) rtrans2 (46) is deactivated, disconnecting capacitors from auxiliary batteries, rbaux (47) deactivates it connecting the auxiliary batteries in series with each other, rtrans1 (48) is deactivated and reconnects the auxiliary batteries serially connected to each other with the external main battery to perform the second energy transference step. The digital output vccbat (49) activates an analog switch that connects the regulated voltage 3.3 V voltage and disconnects the solid state backup battery CBC050.

All components used to manufacture the electronic circuit are free of hazardous substances, therefore, obeys the Restriction of Hazardous Substances use in accordance with the RoHs directive.

Some examples of application methods of the present invention, coupled to some ultra-low power sources of are described below:

Example 1. Arrangement of 8 Capacitors Coupled to 8 Ultra-Low Power Energy Sources.

With the aim of testing the performance of the electronic circuit coupled to an ultra-low power energy source, specifically, PEM fuel cells (8), these can be seen in FIG. 6, where electronic circuit consists of eight 4700 µF 16 V capacitors (9), connected to a seven analog switches NX3L2467 (10) which operate in deactivating mode with 0.5 µW consumption and on activating mode with 1.6 µW consumption and energy sources are eight PEM microbial fuel cells type (8) which are connected to capacitors, and then the capacitors are disconnected of these and interconnected in series, and Atmega328® microcontroller (11) programmed with an energy transfer algorithm which activates two analog switches ADG1634 (12) to connect three lead-acid auxiliary batteries of 4 V model BR-04.8 (13) in parallel connection to charge the batteries with the energy coming from capacitors, the microcontroller (11) is configured to send activation signals to return the electronic circuit to its initial state once the energy transfer to external battery (14) is completed and the voltage is leveled. Voltage from the eight cells (8) was harvested by electronic circuit, resulting in a total capacitors voltage (9) connected in series of 4.36 V. This voltage was transferred to the three auxiliary batteries of 4 V (13) connected in series, increasing its voltage up to 4.32 V. The three batteries (13) connected in series with each other sum a voltage of 12.96 V which was transferred to a 12 V battery NP-7 (14). Based on these results, MFCs voltage was increased from 0.523 V to 12.96 V in order to charge a 12 V battery.

Example 2. Arrangement of 4 Capacitors for Energy Harvesting of Piezoelectric in Two Stages.

With the goal of harvesting energy from mechanical vibrations produced by cantilever deformation of four piezoelectric, it was implemented an energy harvesting electronic circuit which can be seen in FIG. 7, and which consists of four 100 F 2.7 V capacitors (15) which harvest energy from four piezoelectric PZT (lead zirconate titanate) (16), each piezoelectric is connected to a diode (17) that rectified the frequency of voltage and charge a capacitor (15). In the first stage, an Atmega328® microcontroller (18) active three low energy consumption analog switches NX3L2467 (19), which connect the four capacitors (15) and transfer the energy to four NiMH 3.6 V batteries (20), once the transfer has been done, in the second stage, batteries are connected in series through a set of three ADG1634 switches (21) and the energy is transferred to a NP-7 lead acid battery of 12 V (22). For each transfer stage, an energy management electronic circuit is used to ensure the correct batteries charging and to avoid short circuit troubles due to different voltages. The piezoelectric device V25W Volture® (16) generates 15 V in an oscillation frequency of 40 Hz with 15 kgf in the end of the cantilever, once it passes the conditioning step and the rectification step, the voltage down to 985 mV with a power transference of 8 mW and 88% of efficiency. The transferred voltage from capacitors to auxiliary batteries is 3.8 V (20). The sum of the voltage of auxiliary batteries connected in series is 15 V which is transferred to 12 V battery (22). The power of each piezoelectric was added through energy harvesting electronic circuit to integrate the power of four devices, 32 mW, to a 12 V battery (22)

Example 3. Heat Recovery for Electric Energy Generation from an Internal Combustion Engine.

FIG. 8 shows the electronic circuit scheme designed to recover the thermal energy of an internal combustion engine. It uses three thermo electric-generators CIU® Peltier CP60140 (23) which generate 0.8 A and 0.91 V with 50° C. between source and heat sink. Each thermo electric-generator is connected in parallel with a 100 F 2.7 V capacitor (24) until its reach 0.91 V, afterward, energy management electronic circuit controlled by an Atmega328® microcontroller (25) set the capacitors in series through analog switches NX3L2467 (26) to obtain amplified voltage of 2.73 V. The stored energy in capacitors is transferred through analog switches (26) to six 2.4 V NiMH auxiliary batteries connected in parallel with each other (27). Once the voltage is transferred to auxiliary batteries, five analog switches ADG1634 (28) set the batteries in series connection and amplify the voltage to 14.4 V. Due to car batteries have 12 V nominal voltage, it is possible to transfer the voltage from auxiliary batteries to the external main battery (29). Through the energy harvesting system is possible amplifying the voltage from 1.37 V to 14.4 V and transferring 4 W to take advantage of the energy dissipated as heat and charging the car battery.

Example 4. Energy Harvesting Electronic Circuit Coupled to 9 Ultra-Low Power Energy Sources and Operating on Auto Feeding Mode.

With the aim of harvesting energy from microbial fuel cells (30) (such as those described in MX/a/2011/013241 patent), in order to remove the organic matter of domestic and/or commercial wastewater septic tanks, the energy produced by microbial fuel cell is used to supply power to the electronic circuit of the present invention, therefore, it is not necessary to connect the circuit to an external main battery, such as shown in FIG. 9, where the electronic circuit consists of a nine 100 F 2.7 V capacitors set (31), connected to eight analog switches NX3L2467 (32) that operate with 0.5 µW in deactivating mode and with 1.6 µW activating mode and the energy sources are nine PEM type fuel cells (30) that are connected to the capacitors (31) and then disconnected from these and connected in series each other, an Atmega328® microcontroller (33) programmed and configured with an energy transferring algorithm that activates five analog switches ADG1634 (34) that connect six 2.4 V NiMH auxiliary batteries (35) in parallel, which are charged with capacitors energy (31). The solid state battery (36) allows performing the first transference by supplying voltage to the electronic circuit with 3.3 V from cold start when there is not energy available. The voltage amplification begins when the capacitors (31) are disconnected from microbial fuel cells (30) once has been charged to 0.5 V, afterward, the analog switches (32) connect the nine capacitors (31) in series with each other summing a voltage of 4.451 V. Once the capacitors (31) are connected to auxiliary batteries (35), the voltage drops to 1.13 V and the voltage between capacitors and batteries tends to be equal, after 2.56 hours of transferring, the voltage levels off to 2.4 V and microcontroller connect the capacitors (31) to microbial fuel cells (30) again.

The maximum power transferred was 8.75 mW in 12.59 minutes after the transfer began. Calculating the energy from the power values during the transference time in FIG. 11, is obtained 38.76 J. The voltage of auxiliary batteries is amplified again by connecting the batteries in series, thus amplifying the voltage until 14.4 V, this voltage passes through the positive voltage regulator LD1085D2T33R (6), as shown in FIG. 1, and decreases it to 3.3 V for, through the analog switches on terminals 4Y0-4Z (on deactivated state), and 2Y1-2Z (on activated state) supply energy to the electronic circuit FIG. 1 (7).

The impedance of the capacitors connected in series to each other and the batteries connected in parallel to each other was obtained by a potentiostatic electrochemical impedance spectroscopy (PEIS), this technique applies a 5 mV AC signal mounted on a DC voltage. The DC voltage corresponds to the 4.451 V transferred DC voltage from the series capacitors and the 1.13 V voltage of auxiliary batteries. The frequency sweep window for obtaining the impedance profile was from 50 kHz to 5 mHz. This technique allows knowing the internal equivalent resistance of the material of which the capacitors and the batteries are manufactured this resistance can be read in the high-frequency zone when the Nyquist diagram of FIGS. 12A and 12B, cross over the real axis of the impedance. With the equivalent internal resistance values, it is possible to calculate the efficiency of energy transference by a resistance ratio according to the maximum power transferring theorem. As shown in FIG. 12A, the equivalent internal resistance of the capacitors connected in series with each other crosses the real axis of the impedance in 0.856 ohms, and, as shown in FIG. 12B, the resistance of batteries connected in parallel crosses the axis in 0.470 ohms. The efficiency according to the maximum power transferring theorem, known by a skilled technician, results in 35.44% and the transferred energy of 27.47 J. The energy consumed by the electronic circuit during the deactivate state (while capacitors are charging) and the energy consumed during the active state (when transfers energy) is 12.81 J, because of that the circuit can be self-powered with the energy harvested from microbial fuel cells performing as an organic matter removal system.

The invention claimed is:

1. An electronic circuit to harvest energy from ultra-low power sources having voltages within the range of approximately 0.1V to 1.0 V, the electronic circuit to harvest energy from ultra-low power sources comprising a capacitors module comprising a set of capacitors, a microcontroller, two analog switch modules each comprising a set of analog switches, an auxiliary batteries arrangement, a terminal, and an operation mode module with a solid state battery, wherein the capacitors module is configured for connecting with at least two ultra-low power sources;

wherein the microcontroller is configured for:

performing an energy storing step by connecting in parallel each capacitor of the set of capacitors with each ultra-low power source such that a single capacitor of the set of capacitors is directly connected in parallel with a single ultra-low power source;

performing a first energy amplification step, by connecting the set of capacitors in series with each other using the first set of analog switches and by connecting the set of capacitors in parallel with an auxiliary batteries arrangement, wherein the auxiliary batteries arrangement comprises a plurality of auxiliary batteries connected in parallel with each other using a second set of analog switches, thereby resulting in a first amplified energy across the plurality of auxiliary batteries connected in parallel with each other;

performing a first energy transferring step for transferring the first amplified energy from the set of capacitors to each of the plurality of auxiliary batteries;

performing a second energy amplification step, by connecting the plurality of auxiliary batteries in series to each other using the second set of analog switches, thereby resulting in a second amplified energy across the plurality of auxiliary batteries connected in series with each other, performing a second energy transferring step by connecting, in parallel, the plurality of auxiliary batteries connected in series with each other with a main external battery, thereby transferring the second amplified energy to the main external battery, and wherein the auxiliary batteries arrangement is activated by the microcontroller using a third analog switch in order to supply voltage to the electronic circuit when a self-powered mode is required.

2. The electronic circuit to harvest energy from ultra-low power sources according to claim 1, wherein the ultra-low power sources are selected from the group consisting of mechanical vibrations, solar, wind, radio frequencies, thermoformed generators, and fuel cells.

3. The electronic circuit to harvest energy from ultra-low power sources according to claim 1, wherein the capacitors module performs the first amplification step, and an output voltage of the capacitors module is read as an analog signal at the microcontroller, wherein, if the output voltage of the capacitors module is higher than 2.4 V, the microcontroller sends a first digital signal to activate of the third analog switch, thereby transferring the output voltage of the capacitors module to the auxiliary batteries module;

wherein a second digital signal sent by the microcontroller to the auxiliary batteries module connects the plurality of auxiliary batteries in parallel; and wherein a parallel auxiliary battery voltage is monitored every 24 hours using a normally closed terminal of the third analog switch connected with an analog input in the microcontroller by comparing the parallel auxiliary battery voltage with a voltage of the capacitors connected in series, and wherein while the voltage of the capacitors connected in series is higher than the parallel auxiliary battery voltage, the capacitors connected in series will continue transferring current to the auxiliary batteries.

4. The electronic circuit to harvest energy from ultra-low power sources according to claim 1, wherein the microcontroller is also configured to activate the third analog switch in order to change a normal operation mode, wherein the electronic circuit is configured to supply power to the main external battery, to a self-powered mode, wherein the main external battery is not connected to the electronic circuit, wherein:

the self-powered mode is configured for using a solid state battery for cold starting and supplying voltage to the electronic circuit until the first energy amplification step or the second energy amplification step is complete; and the first amplified energy or second amplified energy harvested by the auxiliary batteries in the first energy amplification step or the second energy amplification step is used to supply the voltage to the electronic circuit after the first energy amplification step or the second energy amplification step is complete.

5. The electronic circuit to harvest energy from ultra-low power sources according to claim 3, wherein the microcontroller deactivates the second digital signal to perform the second amplification step through the sum of voltages by reconnecting the auxiliary batteries connected in series to each other; and by means of a third digital signal to activate the third analog switch to perform the second energy transferring step by causing the auxiliary batteries to be connected in series with one another and together to be connected in parallel with the main external battery.

6. The electronic circuit to harvest energy from ultra-low power sources according to claim 1, wherein the microcontroller is configured to operate in a normal mode when performing a comparison between the parallel auxiliary battery voltage and the voltage of the capacitors connected in series, and when transferring energy in the first and second amplification steps; and wherein the microcontroller is configured to operate in an energy saving mode during the energy storing step.

7. The electronic circuit to harvest energy from ultra-low power sources according to claim 1, wherein the set of capacitors of the capacitors module comprises supercapacitors.

8. The electronic circuit to harvest energy from ultra-low power sources according to claim 4, wherein the operation mode module is configured so that the electronic circuit functions independently; and wherein the operation mode module comprises the third analog switch which is powered with a solid state battery voltage of 3.3V at 50uA at a normally closed terminal that supplies a voltage that powers the electronic circuit.

9. The electronic circuit to harvest energy from ultra-low power sources according to claim 4, wherein the microcontroller records a first transfer cycle, sends a digital signal which powers the electronic circuit with a voltage at approximately 3.3V and a maximum current of 3A supplied by a positive voltage regulator.

10. The electronic circuit to harvest energy from ultra-low power sources according to claim 4, wherein the voltage comes from the auxiliary batteries connected in series to thereby prevent the circuit from running out of power during the first transferring step wherein the auxiliary batteries are connected in parallel,
wherein the second digital signal sent by the microcontroller serves as an interlocking signal to connect the solid state battery to a circuit power supply,
wherein, once the complete transfer cycle is performed and the second digital signal is disabled, the electronic circuit is powered by the voltage regulator; and
wherein, the solid state battery is held with 3.3V and connected to the circuit power supply voltage using a diode with a forward voltage of 0.3V and a current of 1A.

11. The electronic circuit to harvest energy from ultra-low power sources according to claim 1, wherein the switches of the first and second sets of analog switches are metal oxide semiconductor field effect transistors (MOSFET).

12. The electronic circuit to harvest energy from ultra-low power sources according to claim 1, wherein the electronic circuit comprises a positive voltage output terminal of 12V or higher, and a negative reference voltage output terminal of 0V, wherein the positive terminal and the negative reference terminal of the main external battery are connected.

13. A non-transitory computer readable medium comprising computer-executable code to cause a processor to harvest energy from ultra-low power sources having voltages within the range of approximately 0.1V to 1.0V of an electronic circuitry, which includes the steps of:
storing energy by connecting in parallel each capacitor of a set of capacitors with each ultra-low power source such that a single capacitor of the set of the capacitors is directly connected in parallel with a single ultra-low power source;
performing a first energy amplification step, by connecting the set of capacitors in series with each other using a first set of analog switches, and subsequently connecting the set of capacitors in parallel with an arrangement of auxiliary batteries, wherein the auxiliary batteries arrangement comprises a plurality of auxiliary batteries connected in parallel with each other using a second set of analog switches, thereby resulting in a first amplified energy across the plurality of auxiliary batteries connected in parallel with each other;
transferring the first amplified energy from the set of capacitors to each of the plurality of auxiliary batteries;
performing a second energy amplification step, by connecting the plurality of auxiliary batteries in series to each other using the second set of analog switches, thereby resulting in second amplified energy across the plurality of auxiliary batteries connected in series with each other, and
transferring by connecting, in parallel, the plurality of auxiliary batteries connected in series with each other with a main external battery, thereby transferring the amplified energy to the main external battery.

14. The electronic circuit to harvest energy from ultra-low power sources according to claim 4, wherein the operation mode module is configured to allow the electronic circuit to function in the self-powered mode when the analog switch is powered by the solid state battery in response to the microcontroller detecting that the first energy transferring step is completed.

15. An electronic circuit to harvest energy from ultra-low power sources having voltages within the range of approximately 0.1V to 1.0 V, the electronic circuit comprising a capacitors module comprising a set of capacitors, a microcontroller, two analog switch modules each comprising a set of analog switches, an auxiliary batteries arrangement, and an operation mode module with a solid state battery,
wherein the capacitors module is configured for connecting with at least two ultra-low power sources;
wherein the microcontroller is configured for:
(a) using the solid state battery for cold starting the electronic circuit and powering the electronic circuit;
(b) performing an energy storing step by connecting in parallel each capacitor of the set of capacitors with each ultra-low power source such that a single capacitor of the set of capacitors is directly connected in parallel with a single ultra-low power source;
(c) performing a first energy amplification step, by connecting the set of capacitors in series with each other using the first set of analog switches and by connecting the set of capacitors in parallel with an auxiliary batteries arrangement, wherein the auxiliary batteries arrangement comprises a plurality of auxiliary batteries connected in parallel with each other using a second set of analog switches, thereby resulting in a first amplified energy across the plurality of auxiliary batteries connected in parallel with each other;
(d) performing a first energy transferring step for transferring the first amplified energy from the set of capacitors to each of the plurality of auxiliary batteries;
(e) performing a second energy amplification step, by connecting the plurality of auxiliary batteries in series to each other using the second set of analog switches, thereby resulting in an amplified energy across the plurality of auxiliary batteries connected in series with each other; and
(f) ceasing use of the solid state battery for powering the electronic circuit and using the first amplified energy or the second amplified energy from the auxiliary batteries for powering the electronic circuit.

16. The electronic circuit of claim 15, wherein the microcontroller is further configured for:
(g) re-performing steps (b), (c), (d), and (e) while the electronic circuit is powered by the first amplified energy or the second amplified energy from the auxiliary batteries.

17. The electronic circuit of claim 15, wherein the microcontroller is further configured to:
(h) operate the electronic circuit in a normal operation mode, wherein the electronic circuit is configured to transfer power to a main external battery connected to the electronic circuit using the second amplified energy, and a self-powered mode, wherein the main external battery is not connected to the electronic circuit and the electronic circuit is powered by the solid state battery and at least one of the first amplified energy and the second amplified energy.

18. The electronic circuit of claim 15, wherein step (f) occurs in response to completion of step (e) and the second amplified energy is used to power the electronic circuit.

19. The electronic circuit of claim 15, wherein step (f) occurs in response to completion of step (c) and the first amplified energy is used to power the electronic circuit.

\* \* \* \* \*